United States Patent [19]

Steckler

[11] 4,060,678

[45] Nov. 29, 1977

[54] CATIONIC HYDROGELS BASED ON HYDROXYALKYL ACRYLATES AND METHACRYLATES

[75] Inventor: Robert Steckler, San Diego, Calif.

[73] Assignee: Plastomedical Sciences, Inc., Briarcliff Manor, N.Y.

[21] Appl. No.: 549,096

[22] Filed: Feb. 11, 1975

[51] Int. Cl.$^2$ .............................................. C08F 220/06
[52] U.S. Cl. ............................. 526/260; 260/79.3 M; 424/167; 526/218; 526/227; 526/230; 526/263; 526/264; 526/292; 526/310
[58] Field of Search ........................... 260/80.72, 80.73; 526/292, 310, 260, 263, 264

[56] References Cited

U.S. PATENT DOCUMENTS

| | | | |
|---|---|---|---|
| 2,979,491 | 4/1961 | Piloni | 260/89.7 N |
| 3,503,942 | 3/1970 | Seiderman | 260/80.75 |
| 3,699,089 | 10/1972 | Wichterle | 260/80.72 |

*Primary Examiner*—Harry Wong, Jr.
*Attorney, Agent, or Firm*—George L. Tone

[57] ABSTRACT

Novel cationic hydrogels, containing basic (cationic) groups in their molecular structure, and processes for their preparation are described. These novel hydrogels are three-dimensional polymer networks, having good water permeability and mechanical properties, and are obtained by simultaneous polymerization and crosslinking, in the presence of a polymerization catalyst, such as an organic peroxide, azobisisobutyronitrile or other free radical polymerization catalyst, of a mixture of (a) hydroxyalkyl acrylate or methacrylate, (b) a cationic monomer — usually an ester of acrylic or methacrylic acid with an amino alcohol, the terminal amino group of which may be quaternized, such as dimethylaminoethyl methacrylate or acrylate and the quaternized derivatives thereof, and (c) a cross-linking agent, such as a glycol diacrylate or dimethacrylate; if desired there may also be present (d) one or more additional monomers, usually an acrylic monomer such as an alkyl acrylate or methacrylate, acrylamides etc. (although other monomers such as vinyl acetate, styrene, etc. may also be used) which is copolymerizable with (a), (b) and (c). The thus obtained cationic hydrogels are useful for combining, by reaction or complexing, with materials having an opposite charge; such as acidic or anionic agricultural chemicals (insecticides, herbicides, fungicides, plant growth regulators, etc.), germicides, pharmaceuticals, cosmetics, hormones, enzymes, flavors, fragrances, antiperspirants, metals and the like, both to recover such acidic or anionic materials from an aqueous medium and for purifying water containing them, and also for the preparation of a complex or other combination of the cationic hydrogel with such materials which may be useful per se or from which the complexed or combined acidic or anionic material may be slowly or controllably released.

6 Claims, No Drawings

CATIONIC HYDROGELS BASED ON HYDROXYALKYL ACRYLATES AND METHACRYLATES

The present invention relates to new and useful cationic, polymeric hydrogels which are stable three dimensional polymer networks, having good water permeability and mechanical properties, and are obtained by simultaneous copolymerization and cross-linking of a mixture of (a) a hydroxyalkyl acrylate or methacrylate (b) a cationic monomer, preferably an ester of an aminoalcohol with acrylic acid or methacrylic acid or the quaternized derivatives of such esters, and (c) a cross-linking agent, such as a glycol diacrylate or dimethacrylate or divinyl benzene, etc., in the presence of a free radical polymerization catalyst, and (d), if desired, other monoethylenically unsaturated monomers which are copolymerizable with components (a), (b) and (c).

BACKGROUND OF THE INVENTION

A number of cationic polymeric materials, containing amino or quaternary ammonium groups which impart cationic functionality thereto, which are homopolymers or copolymers, with other ethylenically unsaturated monomers, are known in the art. One well known type of cationic polymers are the anion exchange resins available under such trade-names as Amberlite, Dowex, Permutit and Zeocarb. Other cationic polymers have found such varied applications in the arts as flocculants, as films and fibers (including use as additives to non-ionic synthetic polymeric films and fibers) having improved dye receptivity, especially for acid dyes, as antistatic agents and a variety of other uses. Such known cationic polymers have however largely, if not always, been rather rigid solids and have not been hydrogels.

Various synthetic polymeric hydrogels, including hydrogels produced by copolymerization of a mixture of monomers containing a hydroxyalkyl acrylate or methacrylate and a cross-linking agent, have also been disclosed in the prior art. As examples of cross-linked polymeric hydrogels, in the preparation of which a hydroxyalkyl acrylate or methacrylate and a cross-linking agent has been used, may be mentioned the cross-linked hydrogels disclosed in my prior U.S. Pat. No. 3,532,679, issued Oct. 6, 1974 and my copending application Ser. No. 383,275 filed July 27, 1973, now Pat. No. 3,878,175 issued Apr. 15, 1975. However, practically all of these known hydrogels are neutral hydrogels and are not ionic in character. While in U.S. Pat. No. 3,689,634, issued Sept. 5, 1972 to Kliment, Vacik, Majkus and Wichterle, entitled Protracted Activity Oral Hydrogel Bead; there is a broad suggestion that "it is also possible to replace the non-ionizable cross-linked hydrogels by physically similar hydrogels containing also ionizable groups"; the only examples of ionic hydrogels disclosed in this patent are: "A porous hydrogel capable of exchanging cations prepared by copolymerizing a mixture of 35 parts of methacrylic acid, and 30 parts of a 25 percent aqueous solution of maleic anhydride." disclosed in Example 8 at the top of column 8 of the patent; and "A copolymer prepared from 97 parts of ethylene glycol monomethacrylate, 2 parts of methacrylic acid and 1 percent of ethylene glycol bis-methacrylate by suspension polymerization in a concentrated, aqueous solution of sodium chloride, using 0.05 parts of diisopropyl percarbonate as a polymerization initiator." disclosed in Example 9 at the middle of column 8 of the patent. These prior art ionic hydrogels are obviously anionic in character and have the opposite charge of those disclosed in the present application. They would, therefor, have quite different properties and uses than those of the present invention.

One of the outstanding advantages of the hydrogels of the present invention which contain cationic groups, as compared with the non-hydrogel form of cationic polymeric materials heretofore obtained by the use of cationic copolymerizable monomers, such as those mentioned above which contain amino or quaternary ammonium groups, is that the hydrogel form of the cationic polymers of the present invention permits and assures much more intimate contact between the cationic groups of the cationic polymeric hydrogel and any acidic material which it is desired to combine or complex therewith. In the presence of water the cationic hydrogels of the present invention are quite permeable and swollen. Due to this swelling the water, and any acidic material dissolved or dispersed therein, of an aqueous medium with which these cationic hydrogels are used, or come in contact with during use, can readily diffuse or be transported throughout the hydrogel. As a result, combination or complexing of an acidic material with the cationic groups of the polymeric hydrogel can and does take place throughout the hydrogel in contrast for example, with the essentially surface action in the case of cationic ion exchange resins. This swelling also increases the distance between the cationic groups of the hydrogel and this is also conducive to more complete reaction. Thus acidic materials can be combined or complexed much more efficiently and completely with the cationic groups of the cationic polymeric hydrogels of the present invention; and, conversely, acidic materials which are complexed or otherwise combined with the cationic groups of the cationic polymeric hydrogels of this invention may be more efficiently released therefrom and transferred to an aqueous medium with which they are used.

OBJECTS OF THE INVENTION

It is, therefore, an object of the present invention to provide a new class of hydrogels which are cationic in nature and which have new and useful properties.

It is a further object of the present invention to provide processes for making these novel hydrogels.

It is a still further object of this invention to provide new and useful compositions and processes containing and/or utilizing these novel cationic hydrogels.

Other and further objects will be apparent as the present description progresses.

DETAILED DESCRIPTION OF THE INVENTION

As previously stated, the novel cationic hydrogels of the present invention are obtained by simultaneous polymerization and cross-linking, in the presence of a free radical polymerization catalyst, of a mixture of:
 a. a hydroxyalkyl acrylate or methacrylate;
 b. a cationic monomer; and
 c. a cross-linking agent;
there may also be present:
 d. one or more other monomers, preferably an acryloid monomer or monomers such as acrylamides or alkyl acrylates or methacrylates, although other monomers such as vinyl acetate, styrene, etc. may be used, which are copolymerizable with (a), (b) and (c).

Component (a)

The hydroxyalkyl acrylates and methacrylates, which may be used as component (a) above, are glyceryl monoacrylates and methacrylates and the glycol and polyglycol acrylates and methacrylates represented by the formula:

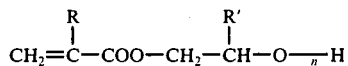

Formula 1.

wherein

R represents hydrogen or alkyl of from 1 to about 6 carbon atoms;

R' represents hydrogen or alkyl of from 1 to about 6 carbons atoms, preferably hydrogen, methyl or ethyl; and $n$ is an integer, preferably of from 1 to about 6, but may be substantially higher such as 25, 50 or even higher.

Such hydroxyalkyl acrylates and methacrylates may be called glycol and polyglycol monoacrylates and monomethacrylates. They are well known in the art and may be obtained by the reaction (alkoxylation) of an α-methylene carboxylic acid, preferably acrylic or methacrylic acid, with a vicinal alkylene oxide, preferably ethylene oxide, propylene oxide or 1,2-butylene oxide until the desired amount of alkylene oxide have been reacted with, added on to, the α-methylene carboxylic acid. It will be appreciated that when so produced $n$ may represent an average value corresponding to the number of moles of alkylene oxide reacted per mole of α-methylene carboxylic acid and that when a higher alkylene oxide, such as propylene oxide or butylene oxide is used some of the product may be of the formula:

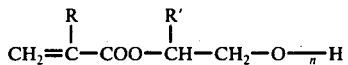

Formula 2.

but most of the product is as depicted in Formula 1. The product may also contain a small amount of unreacted α-methylene carboxylic acid; however, processes are available, such as that disclosed in my copending application Ser. No. 325,840, filed Jan. 22, 1973, now U.S. Pat. No. 3,875,211 issued Apr. 1, 1975, which yield products having only minimal amounts of unreacted acid and such relatively pure products are preferably used. Single products of Formula 1 of high purity may also be obtained by reaction of equimolar proportions of acrylic acid chloride or methacrylic acid chloride, for example, and a glycol or polyglycol such as ethylene glycol, diethylene glycol, triethylene glycol, tetraethylene glycol, propylene glycol, butylene glycol, dipropylene glycol, tripropylene glycol, butylene glycol, tributylene glycol etc. As examples of specific compounds of Formula 1, which may be used as component (a), may be mentioned: 2-hydroxyethylacrylate, 2-hydroxyethylmethacrylate, 2-hydroxyethyl α-chloroacrylate, 2-hydroxyethyl α-ethylacrylate, 2-hydroxyethyl α-propylacrylate, 2-hydroxyethyl α-butylacrylate, 2-hydroxyethyl α-hexylacrylate, 2-hydroxypropyl acrylate or methacrylate, 2-hydroxybutyl acrylate or methacrylate, diethyleneglycol monoacrylate or monomethacrylate, triethyleneglycol monoacrylate or monomethacrylate, tetraethyleneglycol monoacrylate or monomethacrylate, dipropyleneglycol monoacrylate or monomethacrylate, tripropyleneglycol monoacrylate or monomethacrylate, tetrapropyleneglycol monoacrylate or monomethacrylate, dibutyleneglycol monoacrylate or monomethacrylate, tributyleneglycol monoacrylate or monomethacrylate, tetrabutyleneglycol monoacrylate or monomethacrylate and the like or mixtures thereof.

Component (b)

The cationic monomer, which may be used as component (b) above, may be any ethylenically unsaturated monomer containing an amino or quaternary ammonium group, which is copolymerizable with component (a), and which is represented by the formula:

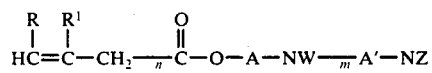

Formula 3.

wherein

R represents hydrogen, methyl or aryl, i.e. phenyl or naphthyl;

$R^1$ represents hydrogen, or alkyl of 1 to about 18 carbon atoms, preferably of from 1 to about 6 carbon atoms;

A and A', each of which may be the same or different, each represents an alkylene group of from about 2 to 8 carbons or an arylene group;

NW and NZ represent amino groups of the formula

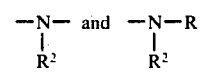

respectively or quaternized group of the formula

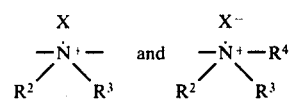

respectively; (as defined following Formula 5 below).

$n$ represents an integer, including O, of from 0 to 10; and $m$ represents an integer, including O, of from 0 to about 5.

As the cationic monomer, used as component (b) above, I particularly prefer the esters of acrylic and methacrylic acid, crotonic acid, vinyl acetic acid, allyl acetic acid, undecylenic acid, etc. with amino alcohols. Such esters can be represented by the formula:

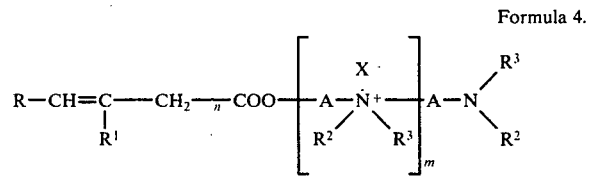

Formula 4.

and the quaternized derivatives thereof (in which the terminal tertiary amino group has been quaternized to a quaternary ammonium group) of the formula:

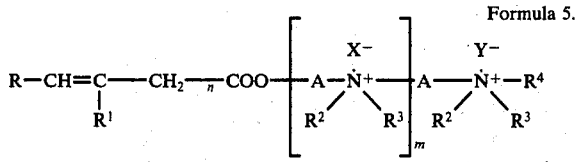

Formula 5.

wherein:
A, each of which may be the same or different, represents an alkylene group of from 1 to about 20 carbon atoms but including oxygen interrupted alkylene groups (i.e.; polyglycol ether group of the formula

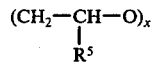

wherein
$R^5$ represents H, methyl or ethyl and
x represents an integer of from 1 to 20);
R represents H or methyl;
$R^1$ represents H or, when R is H, an alkyl group of 1 to 4 carbon atoms, preferably H or methyl;
$R^1$, $R^3$ and $R^4$, each of which may be the same or different, each represents alkyl of from 1 to about 20 carbon atoms, aryl (preferably phenyl), alkaryl (preferably benzyl) or the $R^2$ and $R^3$, on the same nitrogen atom, taken together may represent a divalent aliphatic group of 4 to 5 atoms which jointly with the amino nitrogen forms a five or six membered heterocyclic amino group such as pyrrolidinyl, piperidinyl, morpholino or thiamorpholino and these groups may have a lower alkyl substituent such as a methyl or ethyl group;
X and Y, each of which may be the same or different, each represents an anion (forming the anionic portion of a quaternary ammonium group) such as a halgen ion (fluorine, chlorine, bromine or iodine), a sulfate ion, a hydroxyl ion or a nitrate ion, X is preferably chlorine or bromine and Y is preferably chlorine, bromine or lower alkyl sulfate (i.e.; methyl or ethyl sulfate), and in case there are two or more Xs in the molecule each of them may be the same or different;
n represents an integer, including O, of from 10 to about 10; and
m represents an integer, including O, of from 0 to about 5.

As examples of preferred cationic monomers may be mentioned; dimethylaminoethyl acrylate and methacrylate, diethylaminoethyl acrylate and methacrylate, diisopropylaminoethyl acrylate and methacrylate, dibutylaminoethyl acrylate and methacrylate, dimethylaminobutyl acrylate and methacrylate, diethylaminohexyl acrylate and methacrylate, t-butylaminoethyl methacrylate; t-butylaminoethyl methacrylate, isobutylamino-butyl acrylate, isobutylamino-propyl methacrylate, isobutylamino-ethyl methacrylate, octylamino-ethyl methacrylate, docecylamino-ethyl methacrylate, isohexylaminoethyl methacrylate, (N-propyl-N-methyl) amino-ethyl methacrylate, t-butylamino-ethyl vinyl acetate, t-butylamino-ethyl crotonate, t-butylamino-ethyl isocrotonate, N,N-dimethylamino-ethyl crotonate, N,N-diethylamino-ethyl isocrotonate, etc. and particularly the quaternization products of these and analogous products with such quaternizing agents as dimethylsulfate, methyl chloride and the like. Also such products as 3-methacryloxy-2-hydroxypropyl trimethylammonium chloride, the corresponding 3-acryloxy- compounds and like products disclosed in Rohm and Haas British Pat. No. 1,112,912, published May 8, 1968; Sobolev U.S. Pat. Nos. 3,329,706, issued July 4, 1967 and 3,397,227, issued Aug. 13, 1968, the disclosures of which are incorporated herein by reference. Also the esters of the acrylic acid and methacrylic acid with amino alcohols which contain two or more quaternary ammonium groups, or 1 or more quaternary ammonium groups and a terminal tertiary amino group, such as the quaternization product of dimethylaminoethyl acrylate or methacrylate with diethylaminoethyl chloride hydrochloride and the quaternization products thereof with methylene chloride or dimethylsulfate; the quaternization product of dimethylaminoethyl acrylate or methacrylate with chlorocholine chloride and other related products of this type disclosed in the copending application of myself and S. Linder, Ser. No. 471,441 filed May 20, 1974, now U.S. Pat. No. 4,009,201, the disclosure of which is incorporated herein by reference. Other esters of acrylic and methacrylic acid the ester groups of which contain amino or quaternary ammonium groups are disclosed in Hayck U.S. Pat. No. 2,723,256, issued Nov. 8, 1955. As examples of other basic or cationic monomers, which may be used as component (b), may be mentioned the allyl quaternary ammonium salts disclosed in Langher et al. U.S. Pat. No. 3,532,751, issued Oct. 6, 1970. The disclosures of which are incorporated herein by reference.

Component (c)
As the cross-linking agent, component (c), I particularly prefer the alkylene glycol diacrylates or dimethacrylates and the polyalkylene glycol diacrylates and dimethacrylates, represented by the formula:

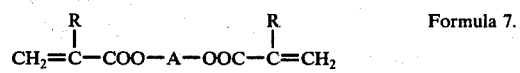

Formula 7.

wherein,
R represents hydrogen or alkyl of 1 to 4 carbon atoms, and
A represents alkylene of from 2 to about 10 carbons or a polyglycol ether group of the formula

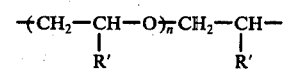

in which
R' represents hydrogen, methyl or ethyl, and
n is an integer of from 1 to about 20, preferably of from 1 to 4
as examples thereof may be mentioned: ethylene glycol diacrylate, ethylene glycol dimethacrylate, propylene glycol diacrylate, propylene glycol dimethacrylate, diethylene glycol diacrylate, diethyleneglycol dimethacrylate, triethylene glycol diacrylate, triethylene glycol dimethacrylate, tetraethylene glycol diacrylate, tetraethylene glycol dimethacrylate, pentaethylene glycol diacrylate, pentaethylene glycol dimethacrylate, hexamethylene glycol diacrylate, hexamethylene glycol dimethacrylate, hexamethylene glycol dimethacrylate, and mixtures of the foregoing. There may also be used such cross-linking agents as divinylbenzene, divinyl ether, divinyl toluene, diallyl tartrate, diallyl maleate, divinyl tartrate, N,N'-methylene-bis-acrylamide, and the like.

Component (d)

As previously stated, there may also be used, as component (d), one or more other monomers which are copolymerizable with (a), (b) and (c). When such a component (d) is used; I particularly prefer to employ such acryloid monomers as acrylamide; methacrylamide or N-(1,1-dimethyl-3-oxobutyl) acrylamide, also called diacetone acrylamide, (described in U.S. Pat. No. 3,497,467 issued Feb. 24, 1970 to Coleman); acrylonitrile or an alkyl acrylate or methacrylate such as methyl acrylate, methyl methacrylate, ethyl acrylate, ethyl methacrylate, propyl acrylate, propyl methacrylate, butyl acrylate, butyl, methacrylate, hexyl acrylate, hexyl methacrylate, octyl acrylate, octyl methacrylate, lauryl acrylate, lauryl methacrylate, etc. The lower members of this series are preferred, because of greater reactivity and because larger percentages can be incorporated into the copolymers without undue reduction of the hydrophilic properties of the copolymers. However other copolymerizable monomers such as vinyl acetate, vinyl propionate, vinyl butyrate, vinyl chloride, vinylidene chloride, vinyl methyl ketone, styrene, methoxystyrene, monochlorostyrene, ar-methylstyrene, ar-ethylstyrene, α,ar-dimethylstyrene, ar,ar-dimethylstyrene, vinylnaphthalene, vinyl benzoate, ethyl vinyl ether, n-butyl vinyl ether, isobutyl vinyl ether, and the like may be used if desired. Mixtures of two or more of the foregoing monomers may also be used as component (d). Heterocyclic N-vinyl monomers, such as N-vinyl pyrrolidone and N-vinyl imidazole disclosed and claimed as the base monomer for cationic hydrogels in my co-filed application Ser. No. 549,097 filed Feb. 11, 1975 may also be used as component (d) in the present invention in an amount less than the 20% by weight minimum specified in said application. It will be understood that when such a copolymerizable monomers, component (d), is employed; it can be considered as a partial replacement, modifier or extender of component (a). It therefore should not be used in an amount greater, by weight, than the amount of component (a) which is used. When such a component (d) is used, the amount of component (a) which is used should be correspondingly reduced.

Considerable variation is possible in the relative amount of each of the forgoing monomer components (a), (b) and (c), and also (d) when present, which is used and a cationic polymeric hydrogel is obtained when the mixture of such monomer components which is subjected to simultaneous polymerization and cross-linking is composed of:

| % by weight (based on total weight of all monomer components used) | Component |
|---|---|
| 40% to about 95% | (a) the hydroxyalkyl acrylate or methacrylate; |
| about 50% to about 0.05% | (b) the cationic monomer; |
| about 0.2 to about 12% | (c) the cross-linking agent; and |
| about 0% to about 50% | (d) one or more other copolymerizable monoethylenically unsaturated monomers. |

As previously stated, when a component (d) is used, the total amount of component (d) which is used in any particular recipe should not exceed the amount of component (a) used in the same recipe; and the total amount of both component (a) and component (d) which is used should not exceed the maximum amount of component (a) (95% by weight of the total monomers) specified above. This can also be expressed "(a) $\geq$ (d) and (a) + (d) = about 40% by weight of the total weight of all monomers used."

The fact that the cationic polymers of the present invention are hydrogels, as distinguished from a solid gel structure, I attribute primarily to the amount of component (a) — hydroxyalkyl acrylate or methacrylate-used in their preparation and only secondarily on the amount of cross-linking agent -component (c) — which is used. Within the forgoing amounts of monomer components, the cross-linking agent appears to effect the water swellability of the hydrogel. With any given recipe the swellability (expressed as water content at equillibrium at 25° C., in percent by weight), of the hydrogel ultimately obtained, decreases as the amount of cross-linking agent employed therein is increased; and is thus inversely proportional to the amount of cross-linker used.

The cationic properties of the hydrogels of the present invention is attributable to the cationic monomer — component (b) — used in their preparation. The amount of anionic materials which can be combined or complexed, with the cationic hydrogels of this invention, is therefore, directly proportional to the amount of cationic monomer used in their preparation. Thus the particular application contemplated for the cationic hydrogel and the amount of anionic material, with which it is desired that they be able to combine, will primarily determine the amount of cationic monomer — component (b) — to be used.

Polymerization and Cross-Linking

The simultaneous polymerization and cross-linking to make the hydrogels of the present invention may be carried out by various techniques known in the art. Thus the polymerization and cross-linking may be effected by bulk polymerization of a mixture of the several monomer components (a), (b), (c), and (d) and (e) if desired, in the proportions given above, in the presence of a free radical polymerization catalyst such as any of the well known inorganic or organic peroxides, azobisisobutyronitrile, etc. polymerization catalysts.

Such catalysts may be employed in the range of about 0.05 to about 4% of the total monomers. The preferred amount of catalyst is about 0.1 to about 2.0% of the monomer components. Typical catalysts include MEK peroxide (methyl ethyl ketone peroxide), lauroyl peroxide, t-butyl-peroctoate, benzoyl peroxide, isopropyl percarbonate, cumene hydroperoxide, dicumyl peroxide, azobisiso-butyronitrile, potassium persulfate, potassium peroxide, etc. Irradiation, as by ultraviolet light or gamma rays, also can be used to catalyze the polymerization and cross-linking.

The polymerization and cross-linking may be effected at temperatures in the range of 20° to 100° C. or somewhat higher, preferably in the range of 35° to about 60°

C., until most of the polymerization is effected, followed by a post-cure at about 100° to about 125° C. for about an hour.

Advantageously, the polymerization and cross-linking may be effected by the use of a casting technique of the type described in my said U.S. Pat. No. 3,532,679 in which a mixture of the monomer components, catalyst and, if desired, a mold release agent is deaerated, as by the application of vacuum until air bubbles no longer rise to the surface, poured into a suitable mold, such as a polymerization tray or cell, which is then sealed and held at a suitable temperature, as by placing in a circulating air oven or heating bath, until a hard polymer is obtained. The hard polymer so obtained may be further cured by heating to a somewhat higher temperature, than that used for the polymerization, such as 100° to 125° C for about an hour. The cell is then opened and the cured polymer removed therefrom. The mold may be in the range of the desired product or the solid polymer may be fabricated, after curing, into the desired shape; e.g., it may be ground into a powder or cut into the desired shape. Such polymerization and cross-linking may also be carried out in the manner described in my said copending application Ser. No. 385,275, filed July 27, 1973, now U.S. Pat. No. 3,878,175 issued Apr. 15, 1975 wherein a solution of the several monomer components in an inert, nonpolar hydrophobic liquid such as silicone liquid, hexane, octane, mineral oil, toluene, xylene, etc. is simultaneously polymerized and cross-linked; whereby toluene, xylene, etc. is simultaneously polymerized and cross-linked, whereby the polymer can ultimately be obtained in a porous or spongy or foamy form.

It will also be understood that the simultaneous polymerization and cross-linking may be effected, employing solvent polymerization techniques, in the presence of water-soluble solvents in which the monomer components (a), (b), (c), (d) and (e) are soluble. Such solvents include the lower aliphatic alcohols such as methanol, ethanol, propanol and isopropanol; acetone, dioxane, ethylene glycol, glycol esters or ethers etc. By such procedures the polymer is obtained in the form of an organogel from which the organic solvent may be removed by washing with water or by distillation or evaporation.

The polymer so obtained by casting may then be immersed in water and thereby gradually swollen into a hydrogel. In the case of polymers produced in a casting technique involving the use of either a hydrophobic or water soluble solvent and which thus still contain the solvent, the solvent is displaced by the water during the immersion. Such displacement of the solvent by the water may be speeded up by kneading or squeezing the polymer during the swelling, as by passing it between squeeze rollers. The swelling in water is continued until equilibrium is reached, or until a hydrogel containing the desired amounts of water is reached. The cationic hydrogels so obtained are soft pliable materials which can be reacted with anionic materials.

It will be appreciated that polymeric products having a predetermined shape may be obtained by the use of molds of the desired shape. Thus, a product having a definite curved shape may be obtained by casting between a pair of curved glass sheets. Rods may be obtained by casting and curing in glass or plastic (e.g. nylon or polyethylene) tubes. Hollow tubes can be cast between two concentrically disposed glass tubes or by centrifugal casting procedures under polymerization conditions.

Further details of the present invention are illustrated in the specific examples which follow of preferred embodiments thereof. In these examples the polymeric cationic hydrogels were prepared employing a conventional type casting cell prepared by inserting a soft and flexible, 3/16 inch thick, vinyl gasket between two pieces of $8 \times 12 - \times 1/4$ inch polished plate glass, the gasket being positioned about one inch from the edge of the glass sheets. The glass plates were then clamped with spring type clamps, such as one inch binder clips or spring loaded clamps. The size of the cell is not critical but will depend on the size of cast sheet desired and any size limitations of the oven or heating bath to be employed. For laboratory preparations I have found glass sizes of up to $16 \times 16$ inches to be convenient. The thickness of the gasket should be about 20-30% greater than the desired thickness of the final cast sheet and round, square or rectangular gaskets with sides or diameter o from about 0.8 to about 0.5 inches may be used to control sheet thickness. Rods may conveniently be cast in sealed glass, nylon, polyethylene, etc. tubing of approximately $\frac{1}{2}$ inch diameter and 12-18 inches long.

The casting mixture consisting of monomers, catalyst, mold release agent or other additives if desired, was deaerated by application of vacuum until air bubbles no longer rose to the surface. The deaerated casting mixture is then poured into the casting cell which is then sealed and placed horizontally on a shelf in a circulating air oven equipped with constant temperature control. Unless otherwise specified it was kept in this oven at 50°-55° C. until substantially polymerized, usually in 18-48 hours. The temperature is then raised gradually (over 2-4 hours) to approximately 100° C, and polymerization completed during 1 to 3 hours at 100°-125° C. The mold was allowed to cool to room temperature, the clips removed, and the mold pried open to release a clear, colorless and rigid sheet.

EXAMPLE 1

To a 1 liter, three neck flask equipped with a mechanical stirrer, nitrogen line and vacuum line there was charged the following reactants:
90 grams of 2-hydroxyethyl methacrylate,
10 grams of the quaternization product obtained by reaction of 1-chloro-2-hydroxypropyl methacrylate with trimethylamine, i.e. the product of the formula;

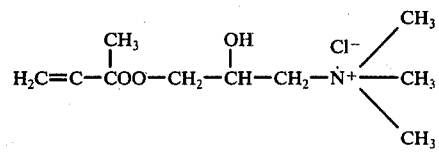

0.4 grams of tetraethyleneglycol dimethacrylate, and
2 grams of MEK peroxide, (LUPERSOL DSW, 11.5% active oxygen, obtained from Lucidol Division of Pennwalt Corp.)

The flask was thoroughly purged with nitrogen while stirring to effect solution and vacuum was then applied until gas bubbles no longer rose to the surface. The solution in the flask was then poured into a laboratory size glass casting cell consisting of two pieces of $8 \times 12 \times \frac{1}{4}$ inch plate glass, clamped to a 3/16 inch thick soft vinyl gasket. The filled mold was sealed and laid horizontally on the shelf in a circulating air oven equipped with constant temperature control and maintained at 60° C, for 40 hours. Polymerization and cross-linking was then continued by gradually raising the temperature of the oven to 110° C. over a three hour period and holding at this temperature for one hour. The mold was removed from the oven and allowed to cool to room temperature, the clamps removed and the mold then pried open. The thus obtained clear, rigid, hard sheet was then immersed in water and allowed to swell until equilibrium had been reached. The thus obtained hydrogel was a soft pliable material, the water content of which, at equilibrium at 25° C., was 35.4% by weight.

EXAMPLE 2

The procedure of Example 1 was repeated using the following charge of reactants:

80 grams of 2-hydroxyethyl methacrylate,
20 grams of the methyl chloride quanternary of dimethylaminoethyl methacrylate, i.e., the product of the formula:

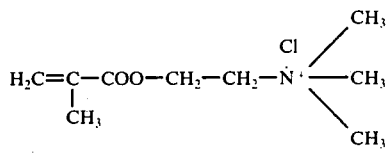

0.2 grams of tetraethyleneglycol dimethacrylate, and
1 gram of MEK peroxide, 11.5% active oxygen.

The soft, pliable hydrogel ultimately obtained had a water content of 56.6% by weight at equilibrium at 25° C.

EXAMPLE 3

The procedure of Example 1 was repeated using the following charge of reactants:

90 grams of 2-hydroxyethyl methacrylate
10 grams of dimethylaminoethyl methacrylate
0.4 grams of tetraethyleneglycol dimethacrylate, and
2 grams of MEK peroxide, 11.5% active oxygen The soft, pliable hydrogel utimately obtained had a water content of 24.7% by weight at equilibrium at 25° C.

EXAMPLE 4

The procedure of Example 1 was repeated using the following charge of reactants:

85 grams of 2-hydroxyethyl methacrylate,
5 grams of methyl acrylate,
10 grams of the quaternization product of 1-chloro-2-hydroxylpropyl methacrylate with trimethyl amine,
0.2 grams of polyethylene glycol 400 dimethacrylate, and
0.1 grams of 2,2'-azobis-2 (2,4-dimethylaleronitrile), (VAZO 52-duPONT)

Initial polymerization took place in an oven at 50° C. for 40 hours, followed by gradually raising the temperature to 100° C, during 5 hours, plus a final cure of 2 hours at 100° C.

Samples of the hydrogels of Examples 1, 2, 3 and 4 readily combine with acidic (anionic) materials when placed in aqueous solutions of the acidic material.

It will be understood that the forgoing examples are illustrative only of the present invention and are not to be interpreted as limiting the invention. A wide variety of cationic hydrogels can readily be prepared employing other specific reactants of the type heretofor specified in the proportions specified. Additional specific recipes useful for the production of cationic hydogels by the process of Examples 1, or analogous procedures, are given immediately below in tabular form.

TABLE 1

| | COMPONENT | RECIPE | 1 | 2 | 3 | 4 | 5 | 6 | 7 | 8 | 9 | 10 | 11 |
|---|---|---|---|---|---|---|---|---|---|---|---|---|---|
| | Hydroxyethyl methacrylate | | | 85 | 80 | 50 | 40 | 60 | | 50 | 70 | 90 | 70 |
| | Hydroxyethyl acrylate | | 80 | | | | | | | 10 | | | |
| (a) | 2,3-Dihydroxypropyl methacrylate-1 (glyceryl monomethacrylate) | | | | | 30 | | | 95 | | | | |
| | Glycidyl methacrylate | | | | | | | | | 20 | | | |
| (b) | Tetraethylene glycol dimethacrylate | | .8 | .1 | .2 | .5 | 1.4 | .5 | .8 | .3 | .3 | .1 | .6 |
| | Aminoethyl methacrylate | | | | 20 | | | | | | | | |
| | Aziridinylethyl methacrylate | | | | | | 50 | | | | | 10 | |
| | Dimethylaminoethyl methacrylate | | | | | 20 | | | | | | | |
| | Tert. butyl aminoethyl methacrylate | | | 15 | | | | | 25 | | | | |
| (c) | 3-Methacryloxy-2-hydroxypropyl trimethyl ammonium chloride | | | | | | | | | | 10 | | |
| | Dimethylaminoethyl methacrylate quaternized with methyl chloride | | 10 | | | | | | | 20 | | | 20 |
| | Dimethylaminoethyl methacrylate quaternized with dimethyl sulfate | | | | | | | | 5 | | | | |
| | Acrylamide | | | | | | | | | | 15 | | |
| (d) | Methacrylamide | | | | | | | | | | | | 10 |
| | Methyl methacrylate | | 10 | | | | | | | | | | |
| | Methyl acrylate | | | | | | 10 | 15 | | 5 | | | |
| Catalyst | Azobisiso-butyronitrile | | .3 | | | | | | | .6 | | | |
| | 2,2'-azobis-(2,4-dimethylvalero-nitrile) | | | .25 | | | .5 | | | | | | |
| | Methyl ethyl ketone peroxide | | | | 1 | 2 | | | 2 | 1 | | 1 | 1.5 |
| | Isopropyl percarbonate | | | | .2 | .1 | | .6 | | | | | |

The thus obtained cationic hydrogels of the present invention have a variety of application in the arts. As previously stated they may readily be combined, by reaction or complexing, with materials having an anionic group or groups. The cationic hydrogels of the present invention in which the cationic groups are quanternary ammonium groups may also be combined, through complex formation, with other anionic compounds or hydrogels, especially those containing sulfate by immersing or washing the cationic hydrogels in an aqeous solution or suspension of an anionic material which it is desired to combine or complex therewith. Alternatively, if the anionic material to be combined or complexed with the cationic hydrogel is stable at the comditions used for polymerization and cross-linking, such stable anionic material may be added to the mixture of monomers prior to or during the simultaneous polymerization and cross-linking so that the cationic hydrogel is obtained directly in the form of its desired reaction product or complex with the anionic material. It is also feasible to form the salt or complex of component (b) — the ethylenically unsaturated monomer which contains a cationic group in its molecular structure — with such stable anionic material, and use such salt or complex as component (b) in the simultaneous polymerization and cross-linking.

Thus, the cationic hydrogels of the present invention may be used as anion exchangers in a manner analogous to known anion exchange resins. The cationic hydrogels of the present invention are particularly valuable for combination with anionic biologically active materials such as anionic agricultural chemicals, anionic drugs and other pharmaceuticals, hormones, enzymes and anionic cosmetic materials; or in the case of quaternary hydrogels of this invention they may be combined, through complex formation, with anionic bactericides, deodorants, sodium heparinate, sodium laurly sulfate etc. As previously stated, such biologically active materials are slowly released, under conditions of use, from such combinations with the cationic hydrogels.

As examples of anionic agricultural chemicals which may be combined with the cationic hydrogels of this invention and which are slowly released therefrom under conditions of use, when applied to plants, may be mentioned: (2,4-dichlorophenoxy) acetic acid; (2,4,5-trichlorophenoxy) acetic acid; 2-(2,4,5-trichlorophenoxy)-propionic acid; and 2,2-dichloropropionic acid.

As examples of anionic pharmaceutical products which may be combined with the cationic hydrogels of this invention may be mentioned: ascorbic acid (vitamin C); aspirin; barbiturates, e.g. 5-ethyl-5-phenylbarbituric acid (phenobarbital); 5-ethyl-5-(1-methylbutyl) barbituric acid (pentobarbital); and 5,5-diethylbarbituric acid (barbital); penicillins, e.g. penicillin G; penicillin K; penicillin X; penicillin F; and dihydro-penicillin F; also such salt forming (alkali soluble) pharmaceuticals as: sulfadiazine; sulfamethazine; and sulfamethylthiazole. As examples of bactericides (useful as topical antiseptics and in deodorants) which may be complexed with quaternary cationic hydrogels of this invention may be mentioned: Hexachlorophene, halogenated phenols, Trisbromosalicylanilide.

I claim:

1. The cationic, polymeric hydrogel produced by the process which comprises simultaneously polymerizing and cross-linking a mixture consisting essentially of the following monomers;

a. about 40 to about 95 weight percent, based on the total weight of monomers of an acrylic monomer selected from the group consisting of glyceryl monoacrylates and monomethacrylates and acrylic monomers having the formula:

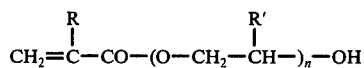

wherein:
R and R' each represents hydrogen or lower alkyl of 1 to about 6 carbon atoms;
n represents an integer of from 1 to about 50;

b. about 50 to about 0.05 weight percent, based on the total weight of monomers, of a monoethylenically unsaturated cationic monomer, capable of copolymerizing with (a), and which is a quaternary ammonium compound having the formula:

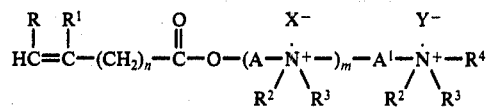

wherein:
R represents hydrogen, methyl or aryl;
R¹ represents hydrogen or alkyl of 1 to about 18 carbons;
A and A¹, each of which may be the same or different, each represents an alkylene group of from about 2 to about 8 carbons or an arylene group;
R², R³ and R⁴, each of which may be the same or different, each represents alkyl, aryl or alkaryl or the R² and R³ on the same nitrogen atom, taken together represent a divalent aliphatic group of 4 to 5 atoms which jointly with the amino nitrogen forms a 5 or 6 membered heterocyclic amino group;
X and Y, each of which may be the same or different, each represents an anion forming the anion portion of a quanternary ammonium group; and
n represents an integer, including O, of from 0 to about 10; and
m represents an integer, including O, of from 0 to about 5;

c. about 0.2 to about 12 weight percent, based on the total weight of monomers, of a polymerizable cross-linking agent capable of copolymerizing with (a) and (b); and having the formula:

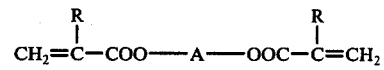

wherein
R represents a member of the group consisting of hydrogen and alkyl of from 1 to about 4 carbon atoms;
A represents alkylene of from 2 to about 10 carbons or a polyglycol ether group of the formula:

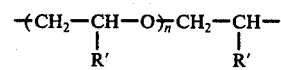

in which
R' represents a member of the group consisting of hydrogen and alkyl of 1 to 2 carbon atoms; and
n represents an integer of from 1 to about 20; and (d) from 0 to about 50 weight percent, based on the total weight of monomers, of other monoethylenically unsaturated monomers capable of copolymerizing with (a), (b) and (c) and selected from the group consisting of: acrylamides, methacrylamides, alkyl acrylates, alkyl methacrylates, N-vinyl lactams, N-vinyl succinimide, N-vinyl diglycoylimide, N-vinyl glutarimide, N-vinyl-3-morpholinone, N-vinyl-5-methyl-3-morpholinone and N-vinyl imidazole;

provided that (a) ≧ (d) and (a) + (d) = about 40 to about 95 weight percent, and when an N-vinyl lactam, N-vinyl succinimide, N-vinyl diglycoylimide, N-vinyl glutarimide, N-vinyl-3-morpholinone, N-vinyl-5-methyl-3-morpholinone or N- vinyl imidazole is used it is present in an amount of less than 20 weight percent;

in the presence of a free radical polymerization catalyst in an amount of from about 0.05 to about 4 weight percent, based on the total weight of monomers; and at a temperature of from about 20° to about 125° C.

2. The cationic, polymeric hydrogel as defined in claim 1, wherein the cationic monomer specified as (b) is the methyl chloride quaternary of dimethylaminoethyl methacrylate.

3. The cationic, polymeric hydrogel as defined in claim 1, wherein the acrylic monomer specified as (a) is a hydroxyalkyl acrylate or methyacrylate.

4. The cationic, polymeric hydrogel as defined in claim 1, wherein the acrylic monomer specified as (a) is 2-hydroxyethyl methacrylate.

5. The cationic, polymeric hydrogel as defined in claim 3, wherein the cationic monomer specified as (b) is the methyl chloride quaternary of dimethylaminoethyl methacrylate.

6. The cationic, polymeric hydrogel as defined in claim 4, wherein the cationic monomer specified as (b) is the methyl chloride quaternary of dimethylaminoethyl methacrylate.

* * * * *

UNITED STATES PATENT AND TRADEMARK OFFICE
CERTIFICATE OF CORRECTION

PATENT NO. : 4,060,678

DATED : Nov. 29, 1977

INVENTOR(S) : Robert Steckler

It is certified that error appears in the above-identified patent and that said Letters Patent are hereby corrected as shown below:

Column 3, line 10, that portion of Formula 1 reading "$-CH_2-CH-O\frac{}{n}-$" with R' on the CH, should read -- $-(CH_2-CH-O-)_n$ -- with R' on the CH. Column 3, line 40 that portion of Formula 2 reading "$-CH-CH_2-O\frac{}{n}-H$" with R' on the CH, should read -- $-(CH-CH_2-O-)_n-H$ -- with R' on the CH. Column 4, line 20 that portion of Formula 3 reading "$-A-NW\frac{}{m}-$" should read -- $(A-NW)_m-$ --. Column 4, lines 20 and 60 and Column 5, line 1, that portion of each of Formula 3, Formula 4 and Formula 5 reading "$-CH_2-$" should read -- $-(CH_2)_n-$ --. Column 5, line 26, "$R^1$" should read -- $R^2$ --. Column 5, line 46, "from 10" should read -- from 0 --. Column 7, line 58 in the first line of the table "40% to about 95%" should read -- about 40% to about 95% --. Column 8, line 3, "about 40% by weight" should read -- about 40% to about 95% by weight --. Column 9, lines 31-32, cancel "whereby toluene, xylene, etc. is simultaneously polymerized and cross-linked". Column 10, line 21, "o from" should read -- of from --.

UNITED STATES PATENT AND TRADEMARK OFFICE
CERTIFICATE OF CORRECTION

PATENT NO. : 4,060,678

DATED : Nov. 29, 1977

INVENTOR(S) : Robert Steckler

It is certified that error appears in the above-identified patent and that said Letters Patent are hereby corrected as shown below:

Column 10, line 53, that portion of the formula reading "$H_2C=C-COO-$" with $CH_3$ above 

should read -- $H_2C=C-COO-$ with $CH_3$ above --. Column 12, line 12, "(2,4-dimethyl-aleronitrile)" should read -- (2,4-dimethylvaleronitrile) --. Column 12, lines 61-62, "containing sulfate by immersing" should read -- containing sulfate or sulfonate groups. Such combinations with anionic materials may be effected by immersing --.

Signed and Sealed this

Thirty-first Day of July 1979

[SEAL]

Attest:

LUTRELLE F. PARKER

*Attesting Officer*   *Acting Commissioner of Patents and Trademarks*